United States Patent
Song et al.

(10) Patent No.: US 12,469,529 B2
(45) Date of Patent: Nov. 11, 2025

(54) BUFFER DEVICE WITH LOW-LATENCY SKID MODE FOR DATA FRESHNESS

(71) Applicant: Rambus Inc., San Jose, CA (US)

(72) Inventors: Taeksang Song, San Jose, CA (US); Evan Lawrence Erickson, Chapel Hill, NC (US); Steven C. Woo, Saratoga, CA (US)

(73) Assignee: Rambus Inc., San Jose, CA (US)

( * ) Notice: Subject to any disclaimer, the term of this patent is extended or adjusted under 35 U.S.C. 154(b) by 145 days.

(21) Appl. No.: 18/531,543

(22) Filed: Dec. 6, 2023

(65) Prior Publication Data
US 2024/0194231 A1 Jun. 13, 2024

Related U.S. Application Data

(60) Provisional application No. 63/431,511, filed on Dec. 9, 2022.

(51) Int. Cl.
*G11C 7/24* (2006.01)
*G11C 7/10* (2006.01)

(52) U.S. Cl.
CPC .......... *G11C 7/1069* (2013.01); *G11C 7/1039* (2013.01); *G11C 7/1063* (2013.01); *G11C 7/24* (2013.01)

(58) Field of Classification Search
CPC ... G11C 7/1069; G11C 7/1039; G11C 7/1063; G11C 7/24; G06F 13/1668
See application file for complete search history.

(56) References Cited

U.S. PATENT DOCUMENTS

| | | | |
|---|---|---|---|
| 9,076,019 B2 | 7/2015 | Gueron et al. | |
| 9,164,677 B2 | 10/2015 | Shim | |
| 9,235,712 B1 * | 1/2016 | Bibikar | G06F 21/575 |
| 9,666,248 B1 * | 5/2017 | Peterson | G11C 7/10 |
| 9,842,021 B2 | 12/2017 | Halbert et al. | |
| 2016/0112201 A1 * | 4/2016 | Misawa | H04L 9/30 |
| | | | 713/168 |
| 2022/0343034 A1 * | 10/2022 | Del Giudice | G06F 21/575 |

OTHER PUBLICATIONS

Elbaz, Reouven et al., "Hardware Mechanisms for Memory Authentication: A Survey of Existing Techniques and Engines", Transactions on Computational Science IV (2009): pp. 1-22. 22 pages.

* cited by examiner

*Primary Examiner* — Khamdan N. Alrobaie
(74) *Attorney, Agent, or Firm* — Lance Kreisman; Peninsula Patent Group (57) ABSTRACT

A buffer integrated circuit (IC) chip is disclosed. The buffer IC chip includes host interface circuitry to receive a read command to retrieve read data from a memory. Memory interface circuitry couples to the memory. Data freshness authentication circuitry performs a freshness verification operation on the read data. Read data forwarding circuitry, in a skid mode of operation, transmits the read data to the host prior to completion of the freshness verification operation.

20 Claims, 8 Drawing Sheets

BUFFER DEVICE WITH LOW-LATENCY SKID MODE FOR DATA FRESHNESS

CROSS-REFERENCE TO RELATED APPLICATIONS

This application is a Non-Provisional that claims priority to U.S. Provisional Application No. 63/431,511 filed Dec. 9, 2022, entitled BUFFER DEVICE WITH LOW-LATENCY SKID MODE FOR DATA FRESHNESS, which is incorporated herein by reference in its entirety.

TECHNICAL FIELD

The disclosure herein relates to buffer devices, related methods, systems and modules that employ such devices.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of buffer devices, methods, systems and associated integrated circuit devices are disclosed herein. One embodiment of a buffer integrated circuit (IC) chip described herein includes host interface circuitry to receive a read command to retrieve read data from a memory. Memory interface circuitry couples to the memory. Data freshness authentication circuitry performs a freshness verification operation on the read data. Read data forwarding circuitry, in a skid mode of operation, transmits the read data to the host prior to completion of the freshness verification operation. By transmitting the read data to the host prior to completion of the freshness verification operation, during the skid mode of operation, the host may receive the read data during the pendency of the freshness verification operation, rather than after the verification operation, thus reducing overall average latency and tail (worst-case) latency while improving performance. In some embodiments, the read data forwarding circuitry is responsive to a mode control value to operate in the skid mode of operation. For some embodiments, failover circuitry may be employed to inform the host in the event of a freshness verification operation failure.

Figure 1:
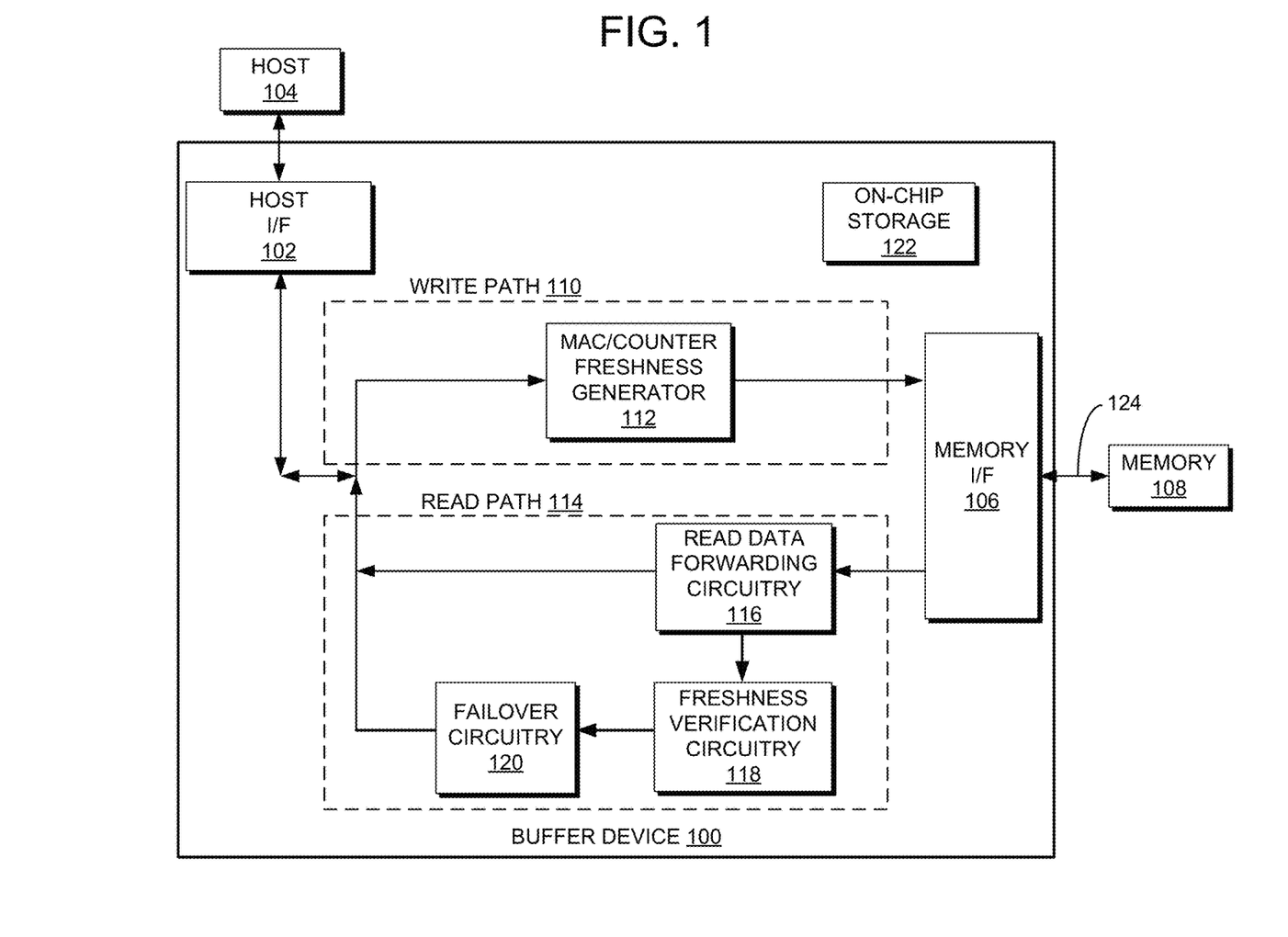
FIG. 1 illustrates one embodiment of a buffer device.

Referring now to FIG. 1, one embodiment of a buffer device, generally designated 100, includes a host interface 102 for coupling to an external host 104. A memory interface 106 couples the buffer device 100 to a memory 108. For one specific embodiment, the host interface 102 is configured to receive requests or messages from the host 104. The requests may take the form of commands, data and/or interrupts. In certain embodiments, as explained more fully below with respect to FIG. 5, the host interface 102 may include a high-bandwidth Compute Express Link (CXL) interface, with the buffer device 100 taking the form of a CXL buffer device.

Further referring to FIG. 1, for specific embodiments, groups of requests may undergo a form of freshness verification during one or more selectable modes of operation. The freshness verification may involve performing various operations to confirm that retrieved data from the memory 108 is, in fact, the latest version of the data, and not an unauthenticated "replayed" version. A skid mode of operation for the freshness verification generally allows for an immediate response of read data from the memory 108 to the host 104, without waiting for the freshness verification to complete. For some embodiments, the read data may be dispatched to the host 104 prior to the start of the freshness verification. Other embodiments may transmit the read data to the host 104 contemporaneously with or following initiation of the freshness verification operation, but before the verification completes. Latency associated with the freshness verification may thus be reduced when using the skid more of operation. For some embodiments, a containment mode of operation may alternatively be employed, which temporarily "contains" or prevents the read data from being transferred to the host 104 until the data freshness operation completes. This may provide a more thorough freshness verification process, but may involve increased latency.

Figure 2:
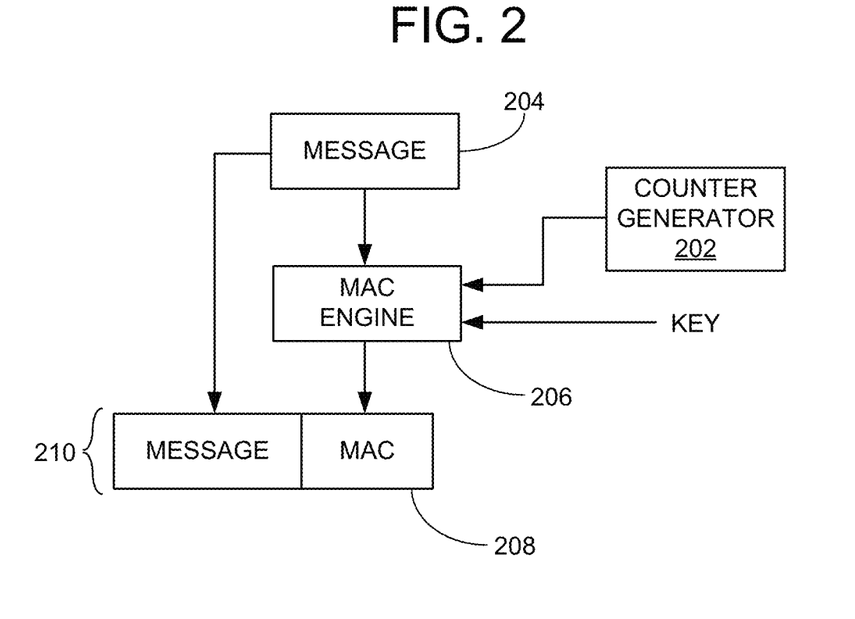
FIG. 2 illustrates a block diagram for generating a message authentication code (MAC) based on a freshness counter.

In an effort to reduce delay, or latency, involved in the freshness verification process, and further referring to FIG. 1, one embodiment of the buffer device 100 employs a write path 110 that includes a message authentication code (MAC) freshness generator 112. Referring now to FIG. 2, for one embodiment, the MAC freshness generator 112 employs a counter generator 202 that creates and feeds a counter value to a MAC engine 206. For some embodiments, the counter value generally corresponds to a number of times a given portion of data has been written to the memory 108 and/or a number of write operations to a particular address. The MAC engine 206 also receives a key value KEY and a message 204 as inputs. The MAC engine 206 encodes the counter value and key information with the message to generate a MAC, at 208, that is associated with the original message 204. The key information KEY may include a private key along with a public key that is pre-provisioned to the buffer device 100 or may a include remotely provisioned or device-generated symmetric key. The message and MAC, at 210, generated by the MAC freshness generator 112 is then fed to the memory interface 106 and written to the memory 108.

Figure 3:
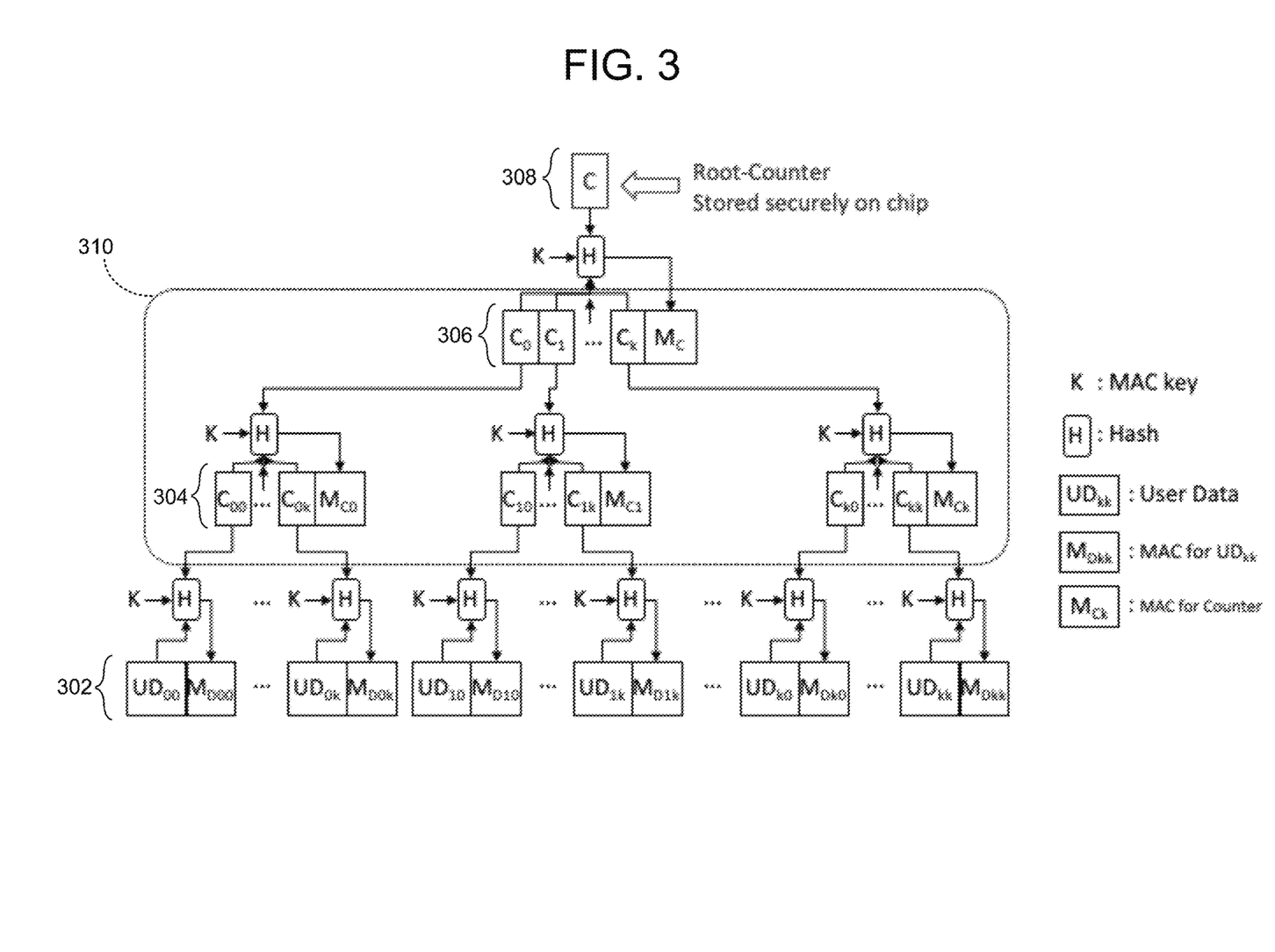
FIG. 3 illustrates one embodiment of a freshness counter tree used in a freshness verification operation.

For some embodiments, to enhance security, the count information encoded in the MAC may be written to multiple memory hierarchies or levels that may involve multiple forms of memory, such as DRAM and on-chip SRAM. For one embodiment, a sequenced security scheme, often referred to as a freshness counter tree employs such a multi-level counter storage process. One embodiment of a counter tree diagram is shown in FIG. 3 and described more fully below. Due to the multiple levels involved, where a first level verification of the tree is based on information from a higher level of the tree, retrieving the message and its associated MAC for freshness verification purposes may involve multiple read operations, and an increase in latency associated with those read operations.

Referring back to FIG. 1, for one embodiment, the buffer device 100 includes a read path 114 for providing read data responses to the host 104. The read path 114 employs read data forwarding circuitry 116 that couples to the host interface 102 to transfer freshness-unverified read data upon retrieval from the memory 108, in the skid mode of operation, or to temporarily hold the read data, in a containment mode of operation, until a full freshness verification is completed by freshness verification circuitry 118. Failover circuitry 120 selectively generates failure information relating to a given freshness verification for dispatch to the host 104 in certain circumstances, described more fully below. For one embodiment, the freshness-unverified read data is partially freshness-verified, and transferred to the host prior to completion of a full freshness verification process.

With continued reference to FIG. 1, for one embodiment, the read data forwarding circuitry 116 includes configurable logic for placing the circuitry in the skid mode of operation or the containment mode of operation. In some embodiments, the configurable logic may be responsive to a mode value retrieved from on-chip storage 122 such as a register or other storage that specifies the mode of operation. Other embodiments may include mode information as part of a request sent by the host 104.

Further referring to FIG. 1, whether operating in a skid mode of operation or a containment mode of operation, read data and its associated MAC retrieved from the memory 108 undergoes a freshness verification by the freshness verification circuitry 118. As noted above, for one embodiment, when generating the freshness MAC, the count information from the counter circuitry 202 (FIG. 2) is applied to various levels of storage, including the memory 108, and the on-chip storage 122. Each update or change to a given portion of write data involves an incremental change in the count information associated with that write data.

For one embodiment, shown in FIG. 3, the stored counter information used by the freshness verification circuitry 118 to perform the freshness verification may be retrieved from a counter tree of multiple memory areas or levels, beginning with a lower level, at 302, to retrieve user data UD and its associated MAC, and progressing to further levels, at 304 and 306, for counter information C and its associated MAC, until reaching a root counter value, at 308. During a complete freshness verification operation, a hash-based algorithm verifies each level of the counter tree with information from a level above it, until the root counter information from the highest and most secure level 308 is reached, typically involving a form of root-of-trust on-chip storage or private on-die storage in the form of static random access memory (SRAM), such as at 122. For one embodiment, the counter information for other levels of the counter tree, such as at 310, including the levels at 304 and 306, may be stored in the memory 108, such as at 310. The number of read operations to retrieve the count information generally corresponds to the number of levels or hierarchies employed by the counter tree. As noted above, for one embodiment a partial freshness verification may be performed that may retrieve one or more of the counter values of the counter tree in an effort to partially verify the freshness of the read data and still reduce the latency in comparison to a full freshness verification.

Referring back to FIG. 1, as noted above, the read path circuitry 114 includes failover circuitry 120 that selectively provides a notification to the host 104 in the event the freshness verification fails, indicating that the read data may have been exposed to a potential replay attack. Various embodiments for failover notifications are described more fully below.

Figure 4A:
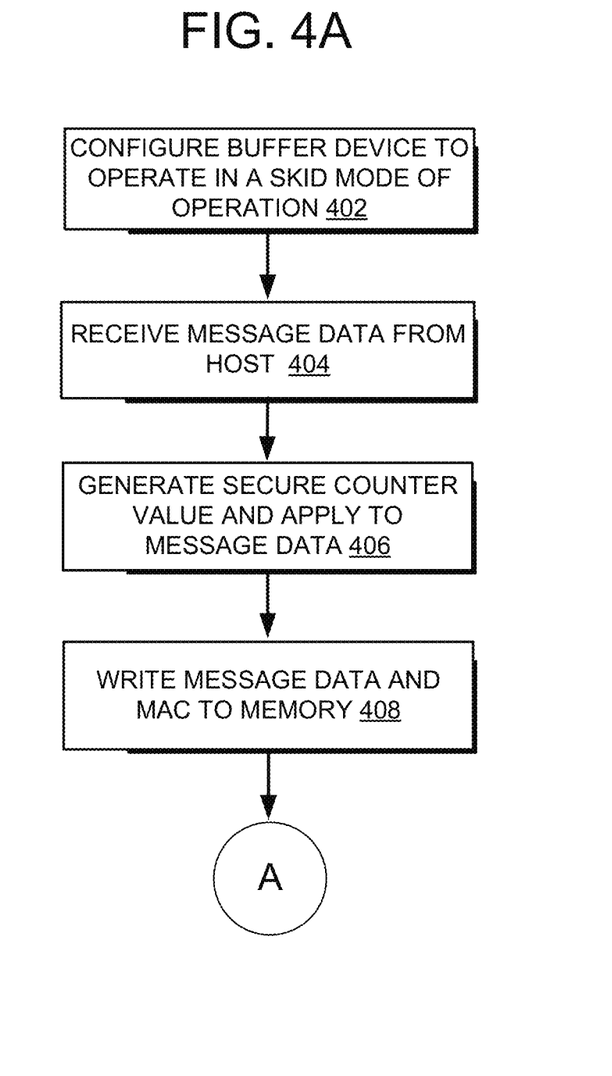
FIG. 4A illustrates steps for one embodiment of a method of operating the buffer device of FIG. 1.
Figure 4B:
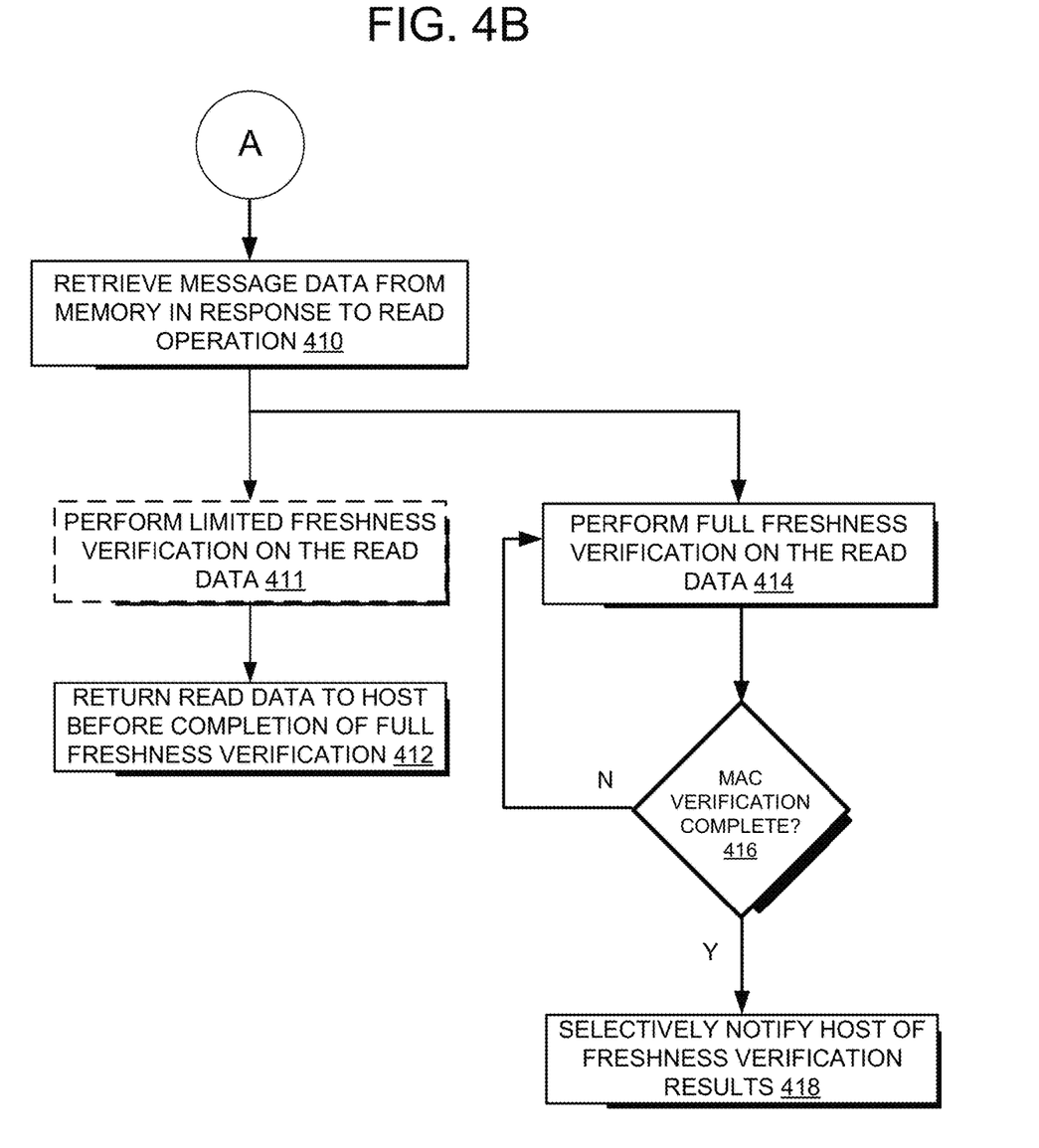
FIG. 4B illustrates further steps for one embodiment of a method of operating the buffer device of FIG. 1.

FIGS. 4A and 4B illustrate a flowchart of steps for one embodiment of a method that may be performed to operate the buffer device 100 for both write and read operations in a manner that, for read operations, selectively forwards read data to the host 104 without waiting for a freshness verification to complete. The method involves steps that are performed by both the write path circuitry 110 and the read path circuitry 114. Generally, the steps performed by the write path circuitry 110 involve generating the MAC for write data using either an initial counter value (for a first-time write operation) or an updated counter value (for a subsequent write operation) as an input and storing the write data and the MAC in the memory 108 and the on-chip secure storage 122. The steps performed by the read path circuitry 114 generally involve retrieving the data as read data with the MAC counter information, selectively forwarding the read data to the host 104 while performing the freshness verification and alerting the host 104 if a failure in the verification occurred.

Further referring to FIG. 4A, for one embodiment, during an initialization or configuration mode, the buffer device 100 may be configured to operate in the skid mode of operation, at 402. As explained above, the skid mode of operation forwards retrieved read data while a complete freshness verification operation associated with that read data is pending. For some embodiments, an alternative skid mode of operation performs a limited freshness verification before returning the fully-freshness-verified read data to the host. In contrast, the containment mode configuration prevents the read data from being returned to the host 104 until a complete freshness verification is performed. For some embodiments, the skid mode of operation may be the only freshness-related mode of operation available for selection.

With continued reference to FIG. 4A, at 404, during a data-transfer mode of operation, the buffer device 100 receives message information from the host 104 in the form of write data and one or more commands requesting a write operation. The write data is passed to the MAC/Counter freshness generator circuitry 112, where a MAC is generated for the write data using the counter information as an input, at 406. For a first-time write operation, the counter value may take the form of a minimum value. For subsequent writes to a given region of memory, the counter value may be incremented from the most-recent prior value. The data and MAC, including the counter information, are written to the memory 108, at 408, with the counter information associated with the write data also written to the root on-chip storage 122. In the event that the write operation is a first time write to a given region of memory, the initial counter value is written to the portions of memory assigned to store count values associated with the counter tree. Where a subsequent write occurs to the given region of memory, an incremented count value is written to those portions of the memory assigned to store the count values as an update to the counter tree. For some embodiments, the count value write operations may occur in the background while the writes associated with the message and MAC take place. Generally speaking, the path between the memory interface 106 and the memory 108, at 124 (FIG. 1) is at the highest risk of being "snooped" or compromised, and where unauthenticated data may be written to the memory 108 in a replay attack. Generating the counter-based MAC for freshness verification reduces this risk.

Referring now to FIG. 4B, in the event the buffer 100 receives message information from the host 104 in the form of a read request, the buffer 100 retrieves the requested read data from the memory 108, at 410. When configured to operate in the skid mode of operation, a copy of the freshness-unverified read data is returned to the host 104 by the read data forwarding circuitry 116, at 412, without waiting for completion of a freshness verification operation. For some embodiments, the freshness unverified read data sent to the host undergoes no freshness verification steps at all. In other embodiments, an optional limited freshness verification may occur, such as at 411, prior to sending the read data to the host. Such an embodiment may involve, for example, reading a single level of the counter tree, such as a last level of the counter tree in a single read operation, and performing a limited verification (such as verifying a MAC calculation on a cache line being read) based on the single count value. Other embodiments may use more than one counter value verification from the counter tree, but still less than the entire tree. At or about the same time that the freshness-unverified read data is being sent to the host, the freshness verification circuitry 118 initiates a freshness verification operation on the user data UD and the MAC/counter information, at 414. As explained above, this involves recursively reading the counter information from multiple levels of the counter tree, as stored in multiple portions of the memory 108 and on-chip storage 122, and confirming that the retrieved count information matches a known count. For skid mode embodiments that employ a limited freshness verification process prior to sending the fully-freshness-unverified read data to the host, a portion of the counter tree read operations will have already been performed. At 416, the freshness verification circuitry 118 iteratively determines whether the verification is completed or not after each read operation corresponding to a given level of the counter tree. When the freshness verification completes, at 418, the failover circuitry 120 selectively notifies the host 104 as to the results of the verification. For some embodiments, a notification may be based on a predetermined timer window, or sent via special protocol communication packets. Further detail for specific embodiments of the failover mechanism in a pooled-memory context are described below.

The buffer device 100 and the associated selective skid method described above lend themselves well to applications involving distributed processing with hardware-based security schemes. In the field of distributed memory processing and memory pooling, CXL Type 3 devices, such as CXL buffers, may exhibit significantly improved performance through adoption of the buffer device structures and associated selective skid methods disclosed herein.

Figure 5:
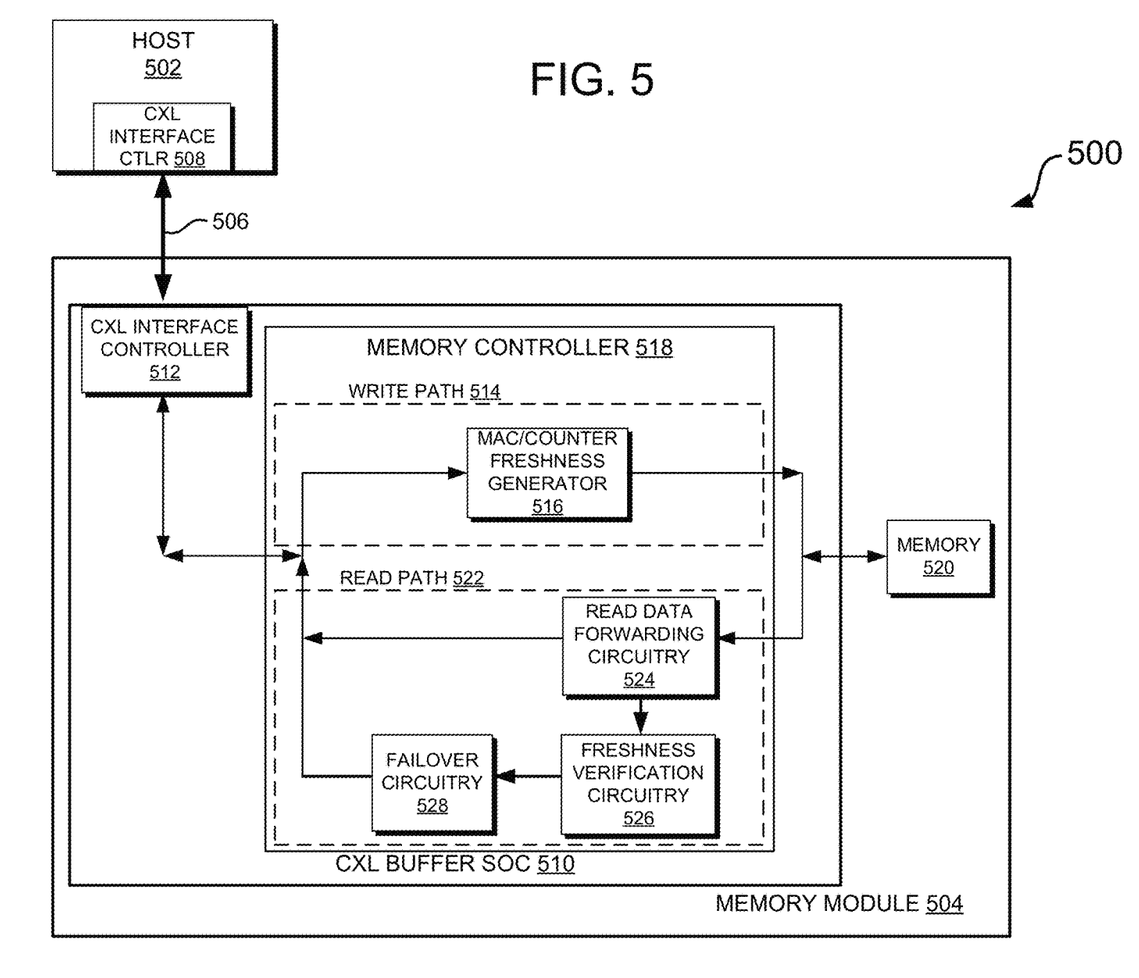
FIG. 5 illustrates one embodiment of a memory system that includes a CXL buffer IC chip.

FIG. 5 illustrates one specific embodiment of a memory system, generally designated 500, that employs a CXL Type 3 memory device in the form of a CXL buffer system-on-chip (SoC) 510. The memory system 500 includes a host 502 that interfaces with a memory module 504 primarily through a CXL link 506. For one embodiment, the host 502 includes a host CXL interface controller 508 for communicating over the CXL link 506 utilizing protocols consistent with the CXL standards, such as CXL.io and CXL.mem. For some embodiments that involve CXL Type 2 devices, an additional CXL.cache protocol may also be utilized.

Further referring to FIG. 5, the memory module 504 is configured to generally support the distributed CXL memory architecture, thus allowing one or more hosts such as the host 502 to access module memory 520. The module memory 520 may take the form of volatile memory, such as dynamic random access memory (DRAM) and/or non-volatile memory, such as Flash memory, via the CXL buffer SoC 510. For one embodiment, the CXL buffer SoC 510 includes many of the features described above with respect to the buffer device 100 (FIG. 1).

With continued reference to FIG. 5, one embodiment of the CXL buffer SoC 510 employs an overall architecture similar to that of FIG. 1, with a host interface that includes an in-band CXL external interface controller 512 and module memory control circuitry in the form of a DRAM controller 518. Similar to the buffer device 100 of FIG. 1, one embodiment of the CXL buffer SoC 510 employs a write path 514 that includes a message authentication code (MAC) freshness generator 516. A read path 522 includes read data forwarding circuitry 524 that couples to the CXL interface controller 512 to transfer fully-freshness-unverified read data upon retrieval from the module memory 520, in the skid mode of operation, or to temporarily hold the read data, in the containment mode of operation, until a full freshness verification is completed by freshness verification circuitry 526. Failover circuitry 528 selectively generates failure information relating to a given freshness verification for dispatch to the host 502 in certain circumstances, described more fully below.

Figure 6:
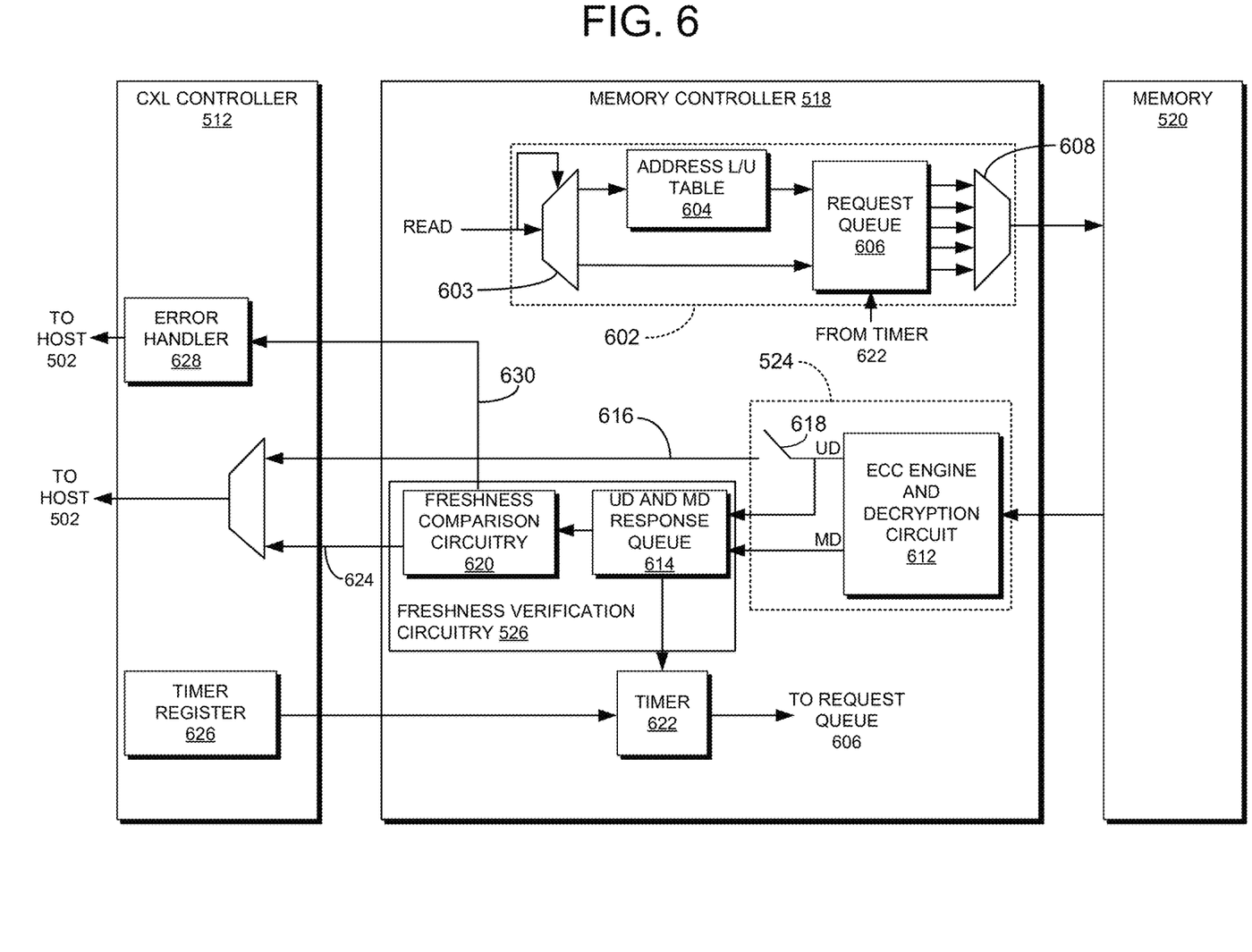
FIG. 6 illustrates further detail for one embodiment of the CXL buffer IC chip of FIG. 5.

Referring now to FIG. 6, for one embodiment, control circuitry 602 in the memory controller 518 includes a deserializer 603 that receives command and address information in a serialized sequence of flits, and deserializes the serial stream into parallel information in a protocol format suitable for the memory controller 518. Address information for a given read request in a host address format is provided to an address lookup table 604 to generate meta data physical address information for the corresponding freshness counter tree. The counter tree address information is fed to a request queue 606, which feeds a scheduler or arbiter 608. The arbiter 608 schedules components of the read request, including the sequenced counter information read operations that "walk the counter tree", according to a given priority and policy. In some circumstances, as more fully described below, an escalation in priority may be supplied by the failover circuitry 528 to reduce the overall latency of the freshness verification operation such that it fits within an expected timing interval.

Further referring to FIG. 6, for one embodiment, the read data forwarding circuitry 524 includes an error correction code (ECC) engine and decryption circuit 612 to receive the requested read data and associated MAC/counter information from the memory 520. For some embodiments, no decryption circuitry is required to supplement the ECC engine. The ECC engine and decryption circuit 612 provides decoded user data UD and meta data MD to the freshness verification circuitry 526. A copy of the user data UD is also applied to configurable logic, such as a switch, at 618. The configurable logic 618 enables a skid path 616 during the skid mode of operation to return an fully-freshness-unverified copy of the user data UD to the CXL interface controller 512 while the freshness verification circuitry 526 performs the freshness verification on the user data UD and the meta data MD. Similar to embodiments described above, in some instances, a partial freshness verification may be performed on the read data during the skid mode prior to it being sent to the host.

With continued reference to FIG. 6, the freshness verification circuitry 526 includes a user data/meta data (UD/MD) response queue 614 to receive and temporarily store the user data and meta data from the ECC engine and decryption circuitry 612. For one embodiment, in the skid mode of operation, the UD/MD response queue 614 holds the UD and MD until a next-level MAC from the counter tree is verified, at which time it forwards the UD and MD to freshness comparison circuitry 620. In a containment mode of operation, the UD/MD response queue 614 may hold the UD and MD until all levels of the MAC verification are completed. For one embodiment, the UD/MD response queue 614 generates a UD response for starting a timing interval or window that is monitored by a timer 622, discussed below.

Further referring to FIG. 6, upon receiving the UD and MD from the UD/MD response queue 614, one embodiment of the freshness comparison circuitry 620 compares the retrieved count information associated with the read data to known count information stored in the secure on-chip storage 122. If the retrieved count information matches the known secure count information, then the freshness of the read data is confirmed, and an acknowledgement in the form of a non-data response (NDR) may be generated and provided to the CXL controller 512 via path 624. For some embodiments, a positive freshness comparison may be assumed, with no response sent, unless a failure in the freshness comparison is detected.

With continued reference to FIG. 6, the failover circuitry 528 (FIG. 5), to selectively provide the host 502 with a response in the event of a failure detected in the freshness verification operation, may take one of a variety of forms. In one embodiment, the failover circuitry 528 includes the timer 622 that starts/stops a timing window when a response, indicating the start/end of a freshness verification operation, is received from the UD/MD response queue 614. The timing window, in some embodiments, may be configurable by programming a timer register 626 to store a value representing the timing window. For other embodiments, the value representing the timing window may be provided in a control signal as part of a message sent by the host 502. The timer 622 may control the priority of accesses to memory for reading the counter information via a connection to the request queue 606. This may provide a form of backpressure as-necessary to avoid an unbounded or unacceptably high-latency scenario for walking the counter tree, and thus maintaining successful operations within the predefined timing window.

Further referring to FIG. 6, in the event of a freshness window violation, which may occur when a stop response is not received within the predefined timing window, the freshness verification circuitry may send an error response to an error handler 628 in the CXL interface controller 512 via error path 630. The error handler 628 may then dispatch an appropriate response to the host 502 indicating that the read data it received may have been exposed to a replay attack. Alternatively, should an error be detected in the freshness verification circuitry, an NDR response may be sent to the CXL interface controller 512, via an available NDR signaling slot, and forwarded to the host 502. A further embodiment involves tracking a maximum number of freshness operations carried out concurrently. A violation of the maximum number threshold may indicate a freshness failure in at least one of the pending operations. The host 502, upon receiving a failure response resulting from any of the above failover embodiments, may then proceed with corrective measures, such as discarding the retrieved read data and executing an appropriate error recovery algorithm.

Figure 7:
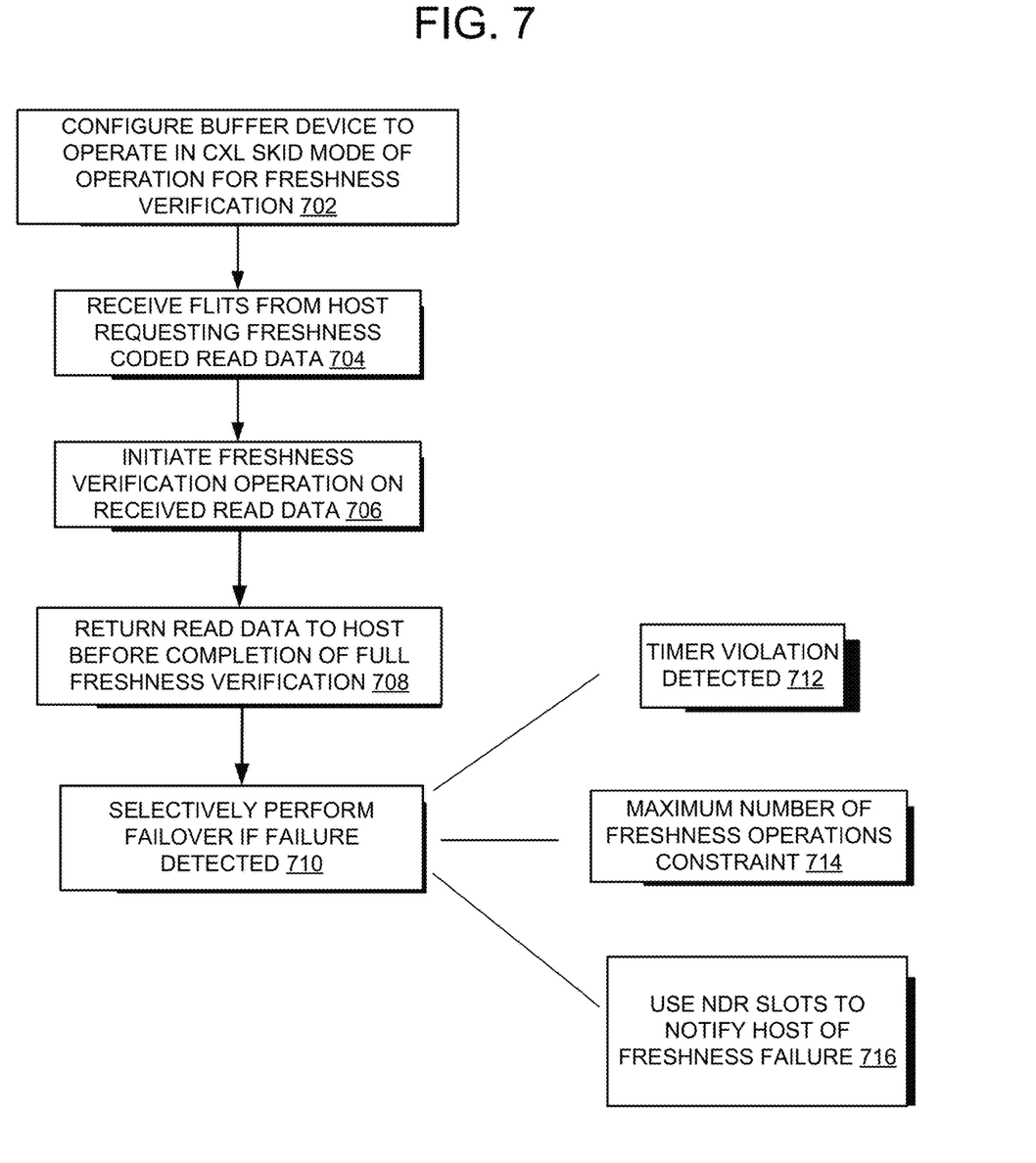
FIG. 7 illustrates a flowchart of steps for one embodiment of operating the CXL buffer IC chip of FIG. 6.

FIG. 7 illustrates a flowchart of steps for one specific embodiment of a method that may be performed to operate the CXL buffer SoC 510 in a manner that selectively forwards read data to the host 502 without waiting for completion of a full freshness verification associated with the read data. During an initialization or configuration mode, the CXL buffer SoC 510 may be configured to operate in a CXL skid mode of operation for freshness verification, at 702. As explained above, the skid mode of operation for freshness verification forwards a fully-freshness-unverified copy of the user read data, involving for example a reduced number of read operations from the freshness counter tree, without waiting for a full freshness verification process to complete. A containment mode of operation for freshness verification, on the other hand, withholds transfer of the read data to the host 502 until the full freshness verification completes.

Further referring to FIG. 7, at 704, the CXL buffer SoC 510 receives information or commands in the form of CXL flits from the host 502 requesting a read operation for freshness-coded read data. The read data and its associated MAC are retrieved from the memory 520 in a sequence of read operations that initiate a freshness verification on the received read data and MAC information, at 706.

With continued reference to FIG. 7, prior to or during the time interval that the full freshness verification is in progress, the fully-freshness-unauthenticated user read data is transferred to the host 502 before completion of the full freshness verification involving read operations to the entire counter tree, at 708. If a failure is detected, for example due to a mismatch of the retrieved counter information to known counter information, or a general MAC verification failure based on a counter verification scheme, then the CXL buffer SoC 510 selectively performs a failover operation, at 710. The failover operation may involve detecting a timer window violation by the timer 622, at 712, detecting a violation of a maximum number of freshness operations being performed at the same time, at 714, or using NDR response slots in the CXL protocol to notify the host 502 of the freshness operation failure, at 716. For some embodiments, NDR response slots may also be used to notify the host 502 of a successful freshness operation.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A buffer integrated circuit (IC) chip, comprising:
host interface circuitry to receive a read command to retrieve read data from a memory;
memory interface circuitry for coupling to the memory;
data freshness authentication circuitry to perform a freshness verification operation on the read data; and
read data forwarding circuitry, in a skid mode of operation, to transmit the read data to the host prior to completion of the freshness verification operation.

2. The buffer IC chip of claim 1, wherein:
the read data forwarding circuitry is responsive to a mode control value to operate in the skid mode of operation.

3. The buffer IC chip of claim 2, further comprising:
storage to store the mode control value.

4. The buffer IC chip of claim 1, wherein:
the read data forwarding circuitry transmits at least a portion of the read data to the host before the freshness verification operation begins.

5. The buffer IC chip of claim 1, wherein:
the read data forwarding circuitry withholds transmitting any of the read data to the host until after the freshness verification operation begins.

6. The buffer IC chip of claim 1, further comprising:
failover circuitry to inform the host of a freshness verification operation failure.

7. The buffer IC chip of claim 6, wherein:
the failover circuitry is to inform the host of the freshness verification failure within a predefined timer interval.

8. The buffer IC chip of claim 6, wherein:
the failover circuitry is to inform the host of the freshness verification failure via a no-data-response (NDR) packet.

9. The buffer IC chip of claim 1, wherein:
the read data forwarding circuitry, in a containment mode of operation, withholds transmitting any of the read data to the host until the freshness verification operation is completed.

10. The buffer IC chip of claim 1, further comprising:
freshness generator circuitry to encode write data with a count value that corresponds to a number of authorized write operations for previously written write data corresponding to the read data; and
wherein the data freshness authentication circuitry is to perform the freshness verification operation on the read data by decoding the count value from the read data and comparing the decoded count value to a known count value.

11. The buffer IC chip of claim 10, wherein the data freshness authentication circuitry further comprises:
circuitry to access multiple levels of a counter tree by dispatching multiple read operations to the memory for multiple counter values that confirm respective levels of the counter tree.

12. The buffer IC chip of claim 10, wherein:
the count value is provided as an input to a processing resource used in calculating a message authentication code (MAC), the MAC used in an integrity verification process.

13. A buffer device, comprising:
host interface circuitry to receive a request to retrieve read data from a memory;
memory interface circuitry for coupling to the memory;
data freshness authentication circuitry to perform a data freshness verification operation on the read data, the data freshness operation based on verifying a count value that corresponds to a number of authorized write operations for previously written write data corresponding to the read data; and
read data forwarding circuitry that is operable in a first mode of operation to transmit the read data to the host prior to completion of the freshness verification operation, the read data forwarding circuitry operable in a second mode of operation to withhold transmitting the read data to the host until completion of the freshness verification operation.

14. The buffer device of claim 13, wherein:
the read data forwarding circuitry is responsive to a mode control value to operate in either the first mode of operation or the second mode of operation.

15. The buffer device of claim 14, further comprising:
register storage to store the mode control value.

16. The buffer device of claim 13, embodied as a Compute Express Link (CXL) buffer chip.

17. A method of operation in a buffer device, the buffer device including a host interface for receiving a request from a host, the request including at least one read command to retrieve read data from a memory, the buffer device including a memory interface for coupling to the memory, the method comprising:
- operating the buffer device in a skid mode of operation for data freshness verifications;
- verifying data freshness for retrieved read data; and
- transmitting the read data to the host prior to completing the verifying of data freshness.

18. The method of claim 17, further comprising:
- informing the host of a freshness verification operation failure.

19. The method of claim 18, wherein the informing comprises:
- setting a predefined timer window within which the freshness verification operation must complete; and
- notifying the host upon expiration of the timer window.

20. The method of claim 18, wherein the informing comprises:
- notifying the host of a freshness verification failure via a no-data-response (NDR) packet.

* * * * *